US010062102B2

(12) United States Patent
Parrish et al.

(10) Patent No.: US 10,062,102 B2
(45) Date of Patent: Aug. 28, 2018

(54) INTERACTIVE INFORMATION DISPLAY

(71) Applicant: Dallas/Fort Worth International Airport Board, Dallas, TX (US)

(72) Inventors: John Parrish, Fort Worth, TX (US); Kelly Tuggle, North Richland Hills, TX (US); Jason Shelton, Irving, TX (US); Michael Latzel, Bedford, TX (US); Jason Stauty, Flower Mound, TX (US)

(73) Assignee: Dallas/Fort Worth International Airport Board, Dallas, TX (US)

( * ) Notice: Subject to any disclaimer, the term of this patent is extended or adjusted under 35 U.S.C. 154(b) by 353 days.

(21) Appl. No.: 14/880,962

(22) Filed: Oct. 12, 2015

(65) Prior Publication Data

US 2016/0104233 A1  Apr. 14, 2016

Related U.S. Application Data

(63) Continuation of application No. 13/679,325, filed on Nov. 16, 2012, now Pat. No. 9,161,174.

(60) Provisional application No. 61/561,799, filed on Nov. 18, 2011.

(51) Int. Cl.
| | |
|---|---|
| G06Q 30/00 | (2012.01) |
| G06Q 30/06 | (2012.01) |
| G06F 3/01 | (2006.01) |
| G01C 21/00 | (2006.01) |
| G01C 21/20 | (2006.01) |
| H04W 4/04 | (2009.01) |
| G06Q 30/02 | (2012.01) |
| H04W 4/02 | (2018.01) |
| G01C 21/36 | (2006.01) |

(52) U.S. Cl.
CPC ......... *G06Q 30/0639* (2013.01); *G01C 21/00* (2013.01); *G01C 21/20* (2013.01); *G01C 21/36* (2013.01); *G06F 3/01* (2013.01); *G06Q 30/00* (2013.01); *G06Q 30/0261* (2013.01); *H04W 4/023* (2013.01); *H04W 4/04* (2013.01)

(58) Field of Classification Search
CPC .......................................... G06Q 30/06–30/08
USPC ................................................ 705/26.1–27.2
See application file for complete search history.

(56) References Cited

U.S. PATENT DOCUMENTS

| 2002/0047787 A1* | 4/2002 | Mikkola ............ G01C 21/3679 340/995.1 |
| 2010/0250384 A1* | 9/2010 | Bhargava ............. G01C 21/343 705/26.1 |

(Continued)

OTHER PUBLICATIONS

"Williams Controls Announces GPS/GIS Contract Award, Honors From Freightliner". (PR Newswire, Aug. 28, 1996) https://dialog.proquest.com/professional/docview/680868375?accountid=142257 (Year: 1996).*

*Primary Examiner* — Ethan D Civan

(57) ABSTRACT

A method, system and computer readable medium are capable of identifying information to display. The method includes identifying a location of a display device. The method includes identifying, in response to a user input, places within a predetermined distance of the location of the display device. The method includes identifying current information about items or services available at the identified places. The method includes displaying, on the display device, the current information about the items or services available at the identified places within the predetermined distance of the display device.

20 Claims, 11 Drawing Sheets

(56) References Cited

U.S. PATENT DOCUMENTS

2011/0093363 A1* 4/2011 Blatstein ................ G06Q 20/20
                                                    705/27.1
2011/0144902 A1* 6/2011 Forte ..................... G01C 21/20
                                                    701/533
2011/0288768 A1* 11/2011 Stefani ............... G06Q 30/0281
                                                    701/533

* cited by examiner

500

BAGGAGE CLAIM INFORMATION

| American Airlines | 6891 Atlanta | Estimated baggage delivery in 15 minutes. |
| American Airlines | 71 Frankfurt | n/S • Mar/J • Nie/L • Ram/E • Tay/D • Web/J  100% Unloaded |
| American Airlines | 3321 Denver | Estimated flight arrival time is 3:45 PM |

DFW

Tuesday, November 15, 2011

FIG. 5

INTERACTIVE INFORMATION DISPLAY

CROSS-REFERENCE TO RELATED APPLICATIONS AND CLAIM OF PRIORITY

The present application is a continuation of U.S. patent application Ser. No. 13/679,325 filed Nov. 16, 2012, which will issue as U.S. Pat. No. 9,161,174 on Oct. 13, 2015. U.S. patent application Ser. No. 13/679,325 claims priority under 35 U.S.C. § 119(e) to U.S. Provisional Patent Application No. 61/561,799 filed Nov. 18, 2011 entitled "INTERACTIVE INTERFACE FOR A TOUCH SCREEN". The contents of both of these patent documents are hereby incorporated by reference into the present application as if fully set forth herein.

TECHNICAL FIELD

The present disclosure relates generally to the display of information. More specifically, the present disclosure relates to determining information to display in a travel environment to assist travelers and related systems and methods.

BACKGROUND

Traveling can be difficult and, at times, stressful. Often travelers are in unfamiliar environments and may not know how to get where they need to go or obtain things they need. Travel itineraries often have strict schedules with penalties of time or monetary expense for not meeting the schedule demands.

Printed signs can provide useful sources of information for travelers. However, printed signs are often contain out-of-date information almost as soon as they are printed and hung.

Accordingly, there is a need for improved systems and methods to assist travelers in traveler environments. Additionally, there is a need for improved systems and methods to identify information to display.

SUMMARY

This disclosure provides methods, systems and computer readable media for identifying information to display to travelers in a travel environment.

Various embodiments of the present disclosure provide methods, systems and computer readable media for identifying information to display. In one embodiment, a method includes identifying a location of a display device. The method includes identifying, in response to a user input, places within a predetermined distance of the location of the display device. The method includes identifying current information about items or services available at the identified places. The method includes displaying, on the display device, the current information about the items or services available at the identified places within the predetermined distance of the display device.

Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 illustrates an example of a travel information screen displayed in accordance with various embodiments of the present disclosure;

DETAILED DESCRIPTION

The various figures and embodiments used to describe the principles of the present invention in this patent document are by way of illustration only and should not be construed in any way to limit the scope of the invention. Those skilled in the art will understand that the principles of the invention may be implemented in any type of suitably-arranged device or system.

Various embodiments of the present disclosure recognize that receiving information can make traveling experiences more efficient, more successful, and even more enjoyable for the traveler. Embodiments of the present disclosure identify and present information to users in a useful and intuitive manner in travel environments to assist the traveler with the efficiency and enjoyment of their travel experience. Embodiments of the present disclosure utilize display devices that can be updated to contain accurate up-to-date information to assist the traveler with the efficiency and enjoyment of their travel experience.

Figure 1:
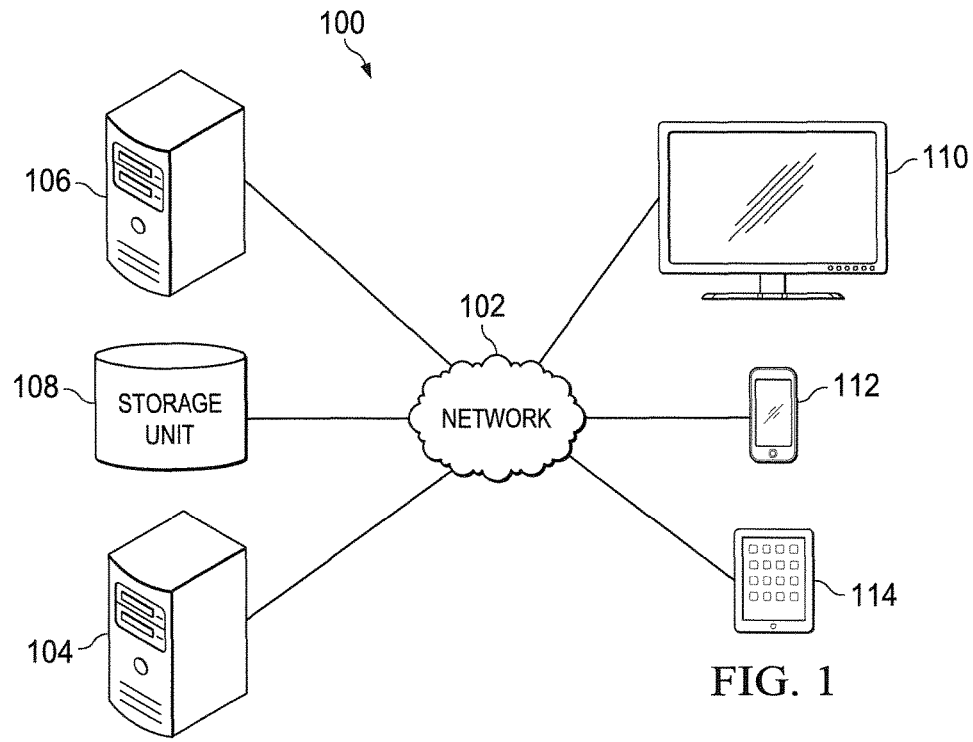
FIG. 1 illustrates an example networked system of computing devices in which various systems and methods described below can be implemented.

FIG. 1 illustrates an example networked system 100 of computing devices in which various systems and methods described below can be implemented. As shown in FIG. 1, the system 100 includes a network 102, which is the medium used to provide communication links between various computers and other devices. The network 102 may include any suitable connections, such as wired, wireless, or fiber optic links. In some embodiments, the network 102 represents at least a portion of the Internet and can include a worldwide collection of networks and gateways that use the Transmission Control Protocol/Internet Protocol suite of protocols to communicate with one another, although any other public and/or private network(s) could be used in the system 100.

In this example, server computers 104-106 connect to the network 102, along with a storage unit 108. In addition, client devices 110-114 connect to the network 102. The client devices 110-114 may be, for example, display terminals, personal computers, network computers, personal digital assistants, mobile smartphones, or mobile computing devices. The client devices 110-114 are clients to the server computers 104-106 in this example. The system 100 may include additional server computers, client devices, or other devices.

In some embodiments, the system 100 is an interactive information distribution system present in a travel environment. For example, the system 100 may provide travelers with travel, retail, and/or service information in the travel environment. In this example, at least one touch screen display terminal or kiosk (e.g. client device 110) is located in a travel environment (e.g., airport, train station, rental car facility, or bus station). The display terminal displays travel-related information to users. Additionally, the display terminal is a touch screen device that users can interact with. For example, responsive to a user input, the display terminal may provide information regarding maps, directions, flight connections, flight gates and terminals, passenger lounges, bathrooms, restaurants, shops, services, weather, or traffic to a user. A user may select one or more options by providing one or more touch inputs to the screen.

The information may be stored locally in the display terminal. Additionally, the display terminal may access the information from servers and databases (e.g., server computers 104-106 and storage unit 108) via network 102. The servers and databases may be part of a local area network. For example, an airport may have databases that store flight and restaurant information. The display terminal may access the information from the databases in the local area network. In other examples, the display terminal may access information (e.g., weather and traffic information) from servers in remote locations via network 102.

Additionally, the information that is available to the user via a display terminal or kiosk can be presented to the user via a personal computing device (e.g., client devices 112-114). The client device may have a special application that is downloaded from a server. The application may connect the client device to receive the travel information when located in the travel environment. In other examples, the client device may access the travel information via a web application, a browser, or any other suitable manner.

Of course, the system 100 may be implemented using a number of different types of networks, such as an intranet, a local area network (LAN), or a wide area network (WAN). FIG. 1 is intended as an example and not as an architectural limitation for the different embodiments described below. Each of the computing devices includes any suitable structure for performing the described functions. Each computing device could, for example, include one or more processing units, one or more memory units storing instructions and data used, generated, or collected by the processing unit(s), and one or more interfaces for communicating over the network 102.

Figure 2:
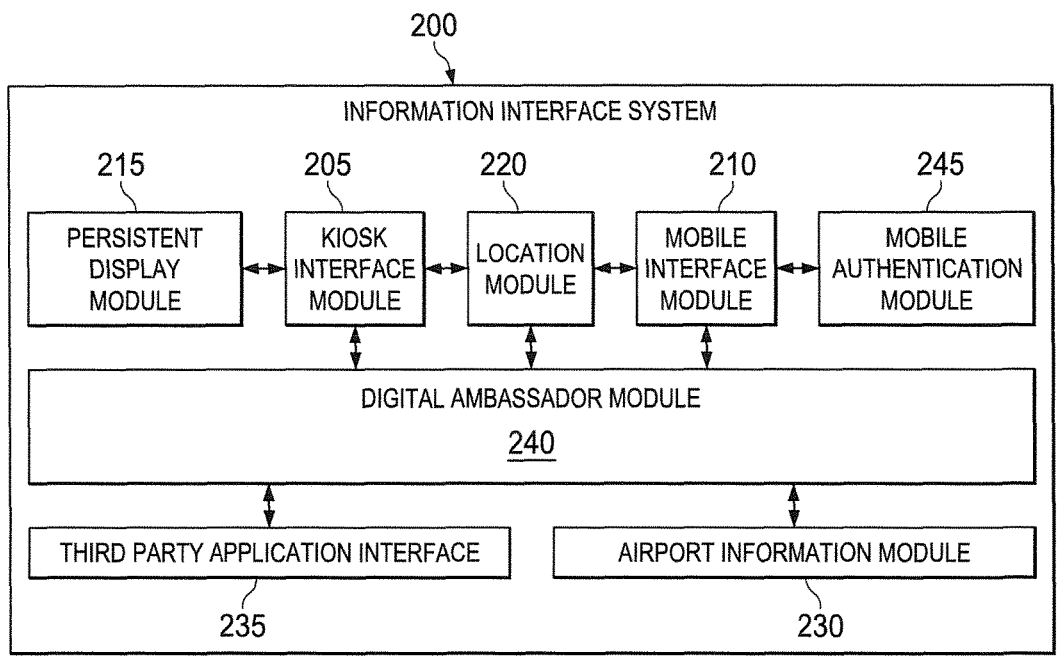
FIG. 2 illustrates an architecture of an example information interface system in accordance with one embodiment of this disclosure.

FIG. 2 illustrates an architecture of an example information interface system 200 in accordance with one embodiment of this disclosure. The information interface system 200 accesses and displays information to one or more users in a travel environment. The information interface system 200 includes a terminal interface module 205 and a mobile interface module 210. The kiosk interface module 205 accesses and displays information via a display device (e.g., client device 110 or a stationary display kiosk located in a travel terminal) to one or more users. For example, when the kiosk interface module 205 is not presently being used, a persistent display module 215 may access general travel information for display. Additionally, the persistent display module 215 may change a location of images to prevent images from being burned into the display device.

The location module 220 provides information regarding a user's location. For example, the location module 220 may identify a location of the display terminal or a mobile device of the user. In order to track the location of the user, the mobile interface module 210 may display a request for permission of the user for the location module 220 to access or track the location of the user's device. The location and tracking may be performed by a GPS signal or by cell service provider localization or multilateration. The user may be provided with incentives to allow location tracking, such as improved service abilities or discounts for travel or shops. The location module 220 may assist in providing services to the user. For example, the location module 220 accesses information about restaurants or shops that are located in proximity to a user. As a particular example, a user may input via the kiosk interface module 205 information regarding an amount of time the user has to spend before a departure. The location module 220 accesses information about restaurants or shops that the user may be able to visit during that amount of time.

In some embodiments, the location module 220 may assist or guide the user to arrive at a desired destination. For example, the user may specify through the kiosk interface module 205 or the mobile interface module 210 a desired destination location (e.g., a travel gate, an inter-terminal connection point, a shop, baggage claim, security check point, etc.). The location module 220 can, based on the user's current location, provide the user with directions and recommended routes to take to arrive at the desired destination. Further, the location module 220 may periodically provide status information as to how the user is progressing on the route to the desired location. For example, the mobile interface module 210 may display route and status information on the user's mobile device. In another example, the location module 220 is approaching and within a viewable distance of a stationary display device located in the terminal. In this situation, a kiosk interface module 205 for that stationary display device may display route and or status information (e.g., estimated time remaining, a positive indication that the user is traveling in the correct direction, the route the user should take, directions for the user to take, etc.).

An airport information module 230 accesses and provides information about an airport. For example, the airport information module 230 may provide information regarding airport maps, bathrooms, passenger lounges, flight terminals, gates, times, and connections. The airport information module 230 may provide this information in response to receiving a request for the information via a touch screen of a display device. In this illustrative embodiment, the airport information module 230 can also access and provide information about baggage claim locations and a present status of baggage delivery from a trip. Note that information about other travel environments (such as train stations, rental car facilities, or bus stations) could also be presented.

A third party application interface 235 accesses and provides information from third party providers. For example, the third party application interface 235 can provide information from outside of the airport or other travel locations. The third party application interface 235 may provide information regarding weather, travel contentions, and traffic outside of the airport or travel location. The third party application interface 235 may also provide information regarding equipment rentals or vehicle rentals from third party vendors.

As previously discussed, information that is accessible and displayable via the kiosk interface module 205 may be accessed and displayed using the mobile interface module 210 on a personal electronic device (e.g., client devices 112 and 114). The mobile interface module 210 can adapt content for display on a user's personal electronic device. In some embodiments, a mobile authentication module 245 authenticates the user device to the information interface system 200. For example, the mobile interface module 210 may detect that the user device has entered an airport or travel location. As another example, the mobile interface module 210 or the kiosk interface module 205 may detect that the user device is within proximity of a display terminal at an airport or travel location. In an example embodiment, the mobile authentication module 245 may present an interface for the user to authenticate to the information interface system 200. In another example embodiment, the mobile authentication module 245 may connect to the information interface system 200 via a user's profile information that is stored on the user device or via a user identifier registered with the information interface system 200.

In this illustrative embodiment, the information interface system 200 includes a digital ambassador module 240. The digital ambassador module 240 accesses and provides information to assist a user in travel. The digital ambassador module 240 may be implemented in a downloadable software application for a user's mobile device, accessible via a website by the user's mobile device or a stationary display kiosk in a travel terminal, and/or an application for a stationary display kiosk in a travel terminal. The digital ambassador module 240 may retrieve information from the location module 220, the airport information module 230, and/or the third party application interface 235 for display on the kiosk interface module 205 and/or the mobile interface module 210.

In various embodiments, the digital ambassador module 240 may retrieve a user profile that includes information about user preferences for shops, types of food, restaurants, frequently used travel providers or travel routes, etc. The digital ambassador module 240 may also retrieve information about a user's travel plans and itinerary. For example, the travel plans and itinerary information may be retrieved from a user profile, travel reservation information, or a code on a ticket scanned by the user's mobile device (e.g., a scanned bar code or quick response (QR) code, etc.).

Based on the information retrieved, the digital ambassador module 240 may interact with the location module 220, the airport information module 230, and/or the third party application interface 235 to provide recommendations to a user. For example, the digital ambassador module 240 may recommend a restaurant from the user's profile information that the user enjoys and has enough time to visit. In another example, the digital ambassador module 240 may determine that the user does not have enough time to travel to a shop or restaurant and may order items or services to be brought to a convenient location for the user. For example, the user may request through the digital ambassador module 240 that the ordered item be delivered to their location at time of ordering (e.g., the location of the user's mobile device or the location of the stationary display kiosk where the user is ordering from), a future user specified location, a user favorite location from the user's profile, the location of the user at time of delivery (e.g., allow the delivery agent access to track the user's current location and heading direction to provide the item at a dynamic delivery location, or the travel departure location (e.g., travel gate)). In some embodiments, a user may be able to pay for such goods and services using the digital ambassador module 240.

In these illustrative embodiments, the information interface system 200 retrieves and provides current, up-to-date information to assist people in travel environments. For example, the information interface system 200 may maintain a database of vendors and current, up-to-date information regarding location, specials, services provided, wait times for services for food service or delivery, etc. The information interface system 200 displays the current, up-to-date information. For example, the information displayed to persons in the travel environment may be the most current, most up to date information for concessions, flights, promotions, etc. The information interface system 200 also provides current, up-to-date traffic, weather, and travel schedule information. For example, the information interface system 200 may send notification messages to a user's mobile devices regarding traffic, weather, or travel schedule updates. This feature may be accessible via an "opt-in" option provided in the mobile interface module 210. In non-limiting examples, the information interface system 200 may identify a user's travel schedule, current location, and traffic or construction information to provide notifications and recommendations, such as, for example, recommendations on traffic directions, notification of construction zones, location, availability, and discounts for valet services, projected wait times for security lines, recommendations on security gates with quicker projected wait times, etc., if the user is determined to be running behind schedule or could face difficulty arriving to their travel gate.

The information provided by the information interface system 200 may be presented in multiple different languages to assist travelers speaking different languages. In some embodiments, the information interface system 200 may provide (e.g., via airport information module 230) an interface for international travelers to fill out and prepare traveler forms, such as, for example, immigration or declaration forms. The information interface system 200 may receive information from the passenger via a scanning device to assist in and/or automate the process of preparing traveler forms. For example, the information interface system 200 may include a barcode scanner, a fingerprint scanner, an optical scanner in connection with a character recognition program (e.g., for obtaining information from passports and other travel or identification documents). The information interface system 200 may allow the user to submit their forms directly to the appropriate authority or may provide a printer to print the appropriate forms for the user to provide to the appropriate authority.

The illustration of the information interface system 200 in FIG. 2 is not meant to imply physical or architectural limitations to the manner in which different illustrative embodiments may be implemented. Other components in addition to and/or in place of the ones illustrated may be used. Some components may be unnecessary in particular illustrative embodiments. Also, the blocks are presented to illustrate some functional components. One or more of these blocks may be combined and/or divided into different blocks when implemented in different illustrative embodiments.

Figure 3:
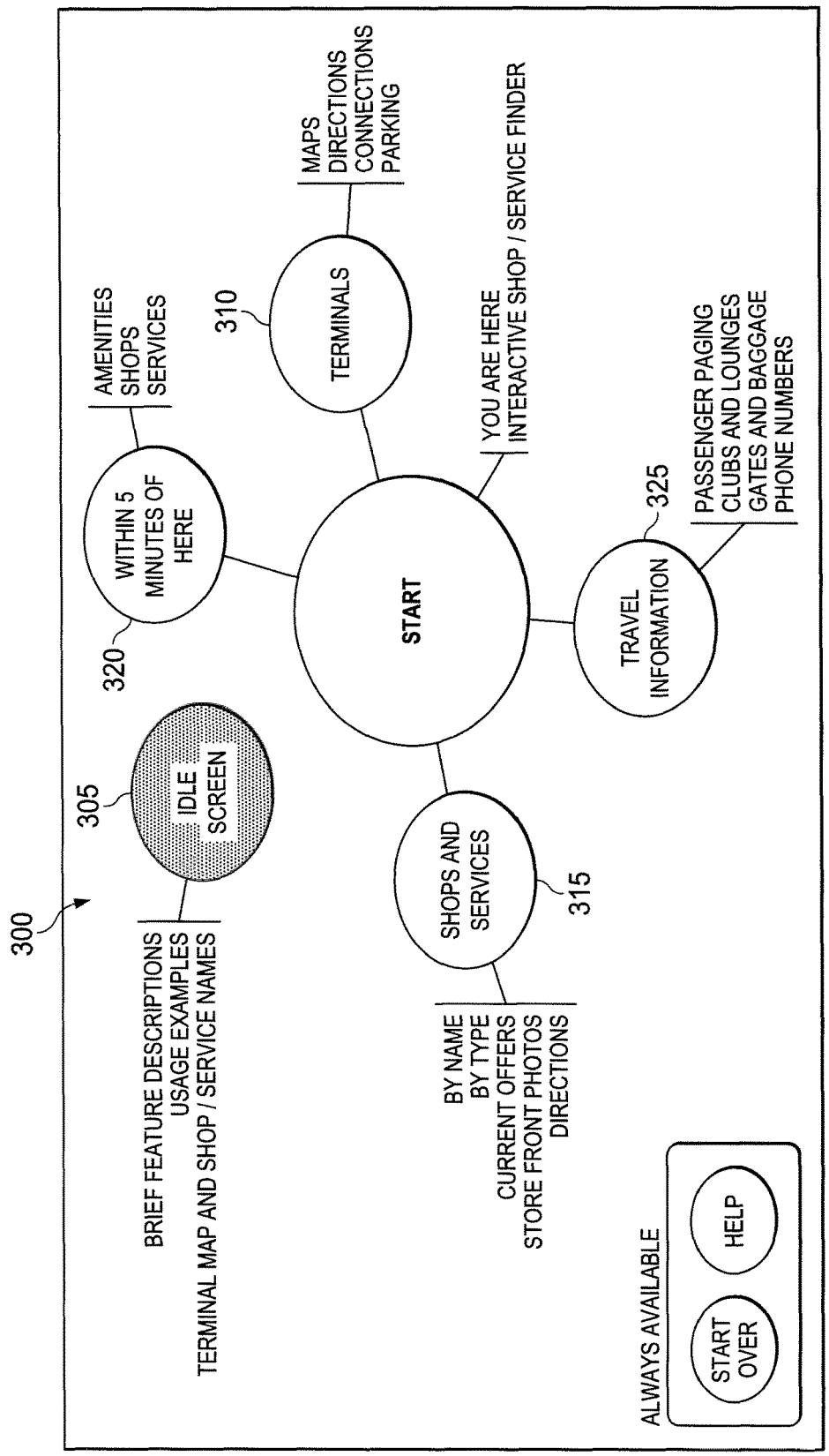
FIG. 3 illustrates a logical diagram of exemplary information menu screens that may be displayed in accordance with various embodiments of the present disclosure.

FIG. 3 illustrates a logical diagram of exemplary information menu screens 300 that may be displayed in the information interface system 200 in accordance with various embodiments of the present disclosure. For example, the menu screens 300 may be displayed in kiosk interface module 205 or the mobile interface module 210 in FIG. 2. In this illustrative example, the menu screens 300 include an idle menu screen 305 which may be selected to avoid images from being "burned in" to the screen if the image appears in the same place for too long and/or may include images to draw the attention of nearby persons and encourage interaction by providing a brief demonstration or tutorial of functionality. For example, while the screen is not in use, different images may be displayed providing feature descriptions, usage examples, or maps of terminal information. The idle menu screen 305 may also include a display of invitations to make use of the features of the information interface system 200.

The terminals menu screen 310 provides proportionally accurate, annotated, and interactive maps of traveling terminals. The maps are oriented toward the user's point of view based on the location of the user. For example, the information interface system 200 may identify the location of the display device (e.g., stationary terminal or mobile user device) and present a "You Are Here" indicator that shows the direction the user is facing. The terminals menu screen 310 may also provide displays of visual paths to gates in the current terminal, how to get to other terminals (including alternate routes if, for example, primary terminal transportation is disabled), directions to baggage claim areas, security offices, restrooms, custom artwork, different types of transportation, and information about parking options.

The shops and services menu screen 315 provides the ability to browse listings of available concessions areas, including restaurants, book stores, newsstands, electronics stores, vending machines, coffee shops, etc. In addition to browsing by business name, the shops and services menu screen 315 may be categorized one or more ways to allow for different kinds of browsing. For example, a user might choose to look for "sit down" restaurants as opposed to "fast food" restaurants or choose between experiences based on amount of available time, such as "I have 30 minutes" vs. "I have more than an hour." The shops and services menu screen 315 may, for individual shops, include a logo, a storefront photo and/or some form of discount offer that can change from time to time. The shops and services menu screen 315 may also provide advertisements and specials for different shops and services.

The shops and services menu screen 315 also provides the ability to browse available specialty services, including places to charge electronic devices, automated teller machines (ATMs), shipping services, drop boxes, on-site hotels, etc. Some services can also be shops, and vice versa. In addition to browsing by business name, the shops and services menu screen 315 may also categorize services one or more ways to allow for different kinds of browsing.

The "within 5 minutes of here" menu screen 320 provides users with a quick view of necessities, shops, and services within a five minute walk from the user's current location (e.g., the location of a stationary display device or location determined based on the user's tracked mobile device). This "within 5 minutes of here" menu screen 320 allows users to narrow down by type, such as restaurant, coffee shop, restrooms, etc., and activities capable of being performed without having to travel far or take a long time to access. Additionally, categorizations of filtering shops, services, and amenities may include categorizing by user feeling such as if the traveler is feeling "hungry," "rushed," "bored," etc.

The travel information menu screen 325 provides users the ability to access resources for a specific travel provided, such as an airline, train, bus, or car travel provided. For example, travel information menu screen 325 may provide detailed information, such as arrival and departure schedules and gates, the directions to travel provider wait areas (e.g., an admirals club and similar offers from other airlines), or a phone number to call, page a representative of the travel provider, or general customer service information.

The menu screens 300 may also provide weather information including current, local weather information. Any and all of the menu screens 300 may be embodied in a stationary application, such as a stationary display kiosk, or a mobile application, such as a smart phone or other mobile personal electronic device. In embodiments of a stationary application, the information interface system 200 may provide functionally to communicate information from the stationary display kiosk to a user's mobile device (e.g., via a "take this with you" function within the menu screens 300. For example, the information from a stationary display kiosk may be communicated to a user's mobile device via near field communication, WiFi, Bluetooth™ email message, and/or text message. For example, the information may be sent to the mobile interface module 210 on the user's mobile device, placed in an email or text message, and/or provided at a website accessible by a browser of the user's mobile device with the browser address (e.g., uniform resource locator (URL)) sent to the user's mobile device or displayed on the stationary display kiosk.

Figure 4:
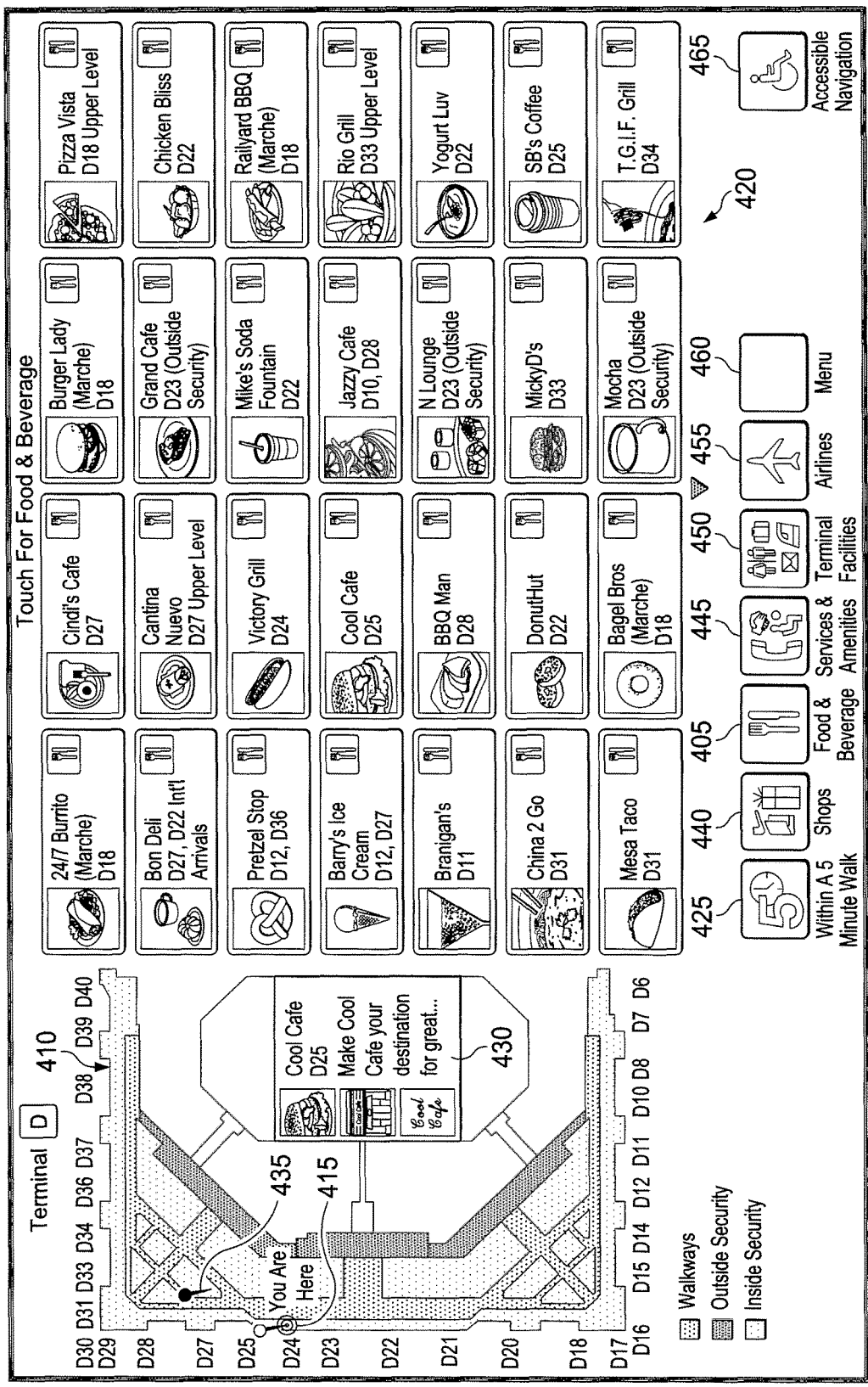
FIG. 4 illustrates a display of information provided in accordance with various embodiments of the present disclosure.

FIG. 4 illustrates a display 400 of information provided in accordance with various embodiments of the present disclosure. In this illustrative embodiment, display 400 is a food and beverage information display that may be displayed, for example, upon selection of the shops and services menu screen 315 in FIG. 3. For example, a user may have selected the food and beverage icon 405 on the display 400. The display 400 also displays a terminal map 410 with gate information and an indicator 415 of the user's location (e.g., a "you are here" indicator).

The display 400 provides a list 420 of food and beverage providers. The list 420 may be filtered based on location, for example, of those located in the airport, the terminal, or within a predefined walking distance of the user's location (e.g., five minutes accessible via the "within a 5-minute walk" icon 425 on display 400). The user may scroll among providers in the list 420 and select icons to find detailed information about the provider. For example, the display 400 may display detailed information 430 including the location 435 about a recommended or selected provider from the list 420. The user can request other information to be displayed using, for example, the shops icon 440, the services and amenities icon 445, the terminal facilities icon 450, the airlines icon 455, or the menu icon 460. The menu icon 460 allows a user to navigate between travel terminals.

The display 400 also includes an accessible navigation icon 465 to assist travelers that have special needs. For example, pressing the accessible navigation icon 465 may cause the content displayed on the display 400 to be lowered for a person in a wheelchair to easily access the functionality of the kiosk.

FIG. 5 illustrates an example a travel information screen 500 displayed in accordance with various embodiments of the present disclosure. The travel information screen 500 is an example of a screen that may be displayed via the travel information menu screen 325 in FIG. 3. In this illustrative example, the travel information screen 500 provides a display of baggage claim information. This display may be presented by kiosk interface module 205 on a stationary display device or by mobile interface module 210 on a mobile device.

Figure 6A:
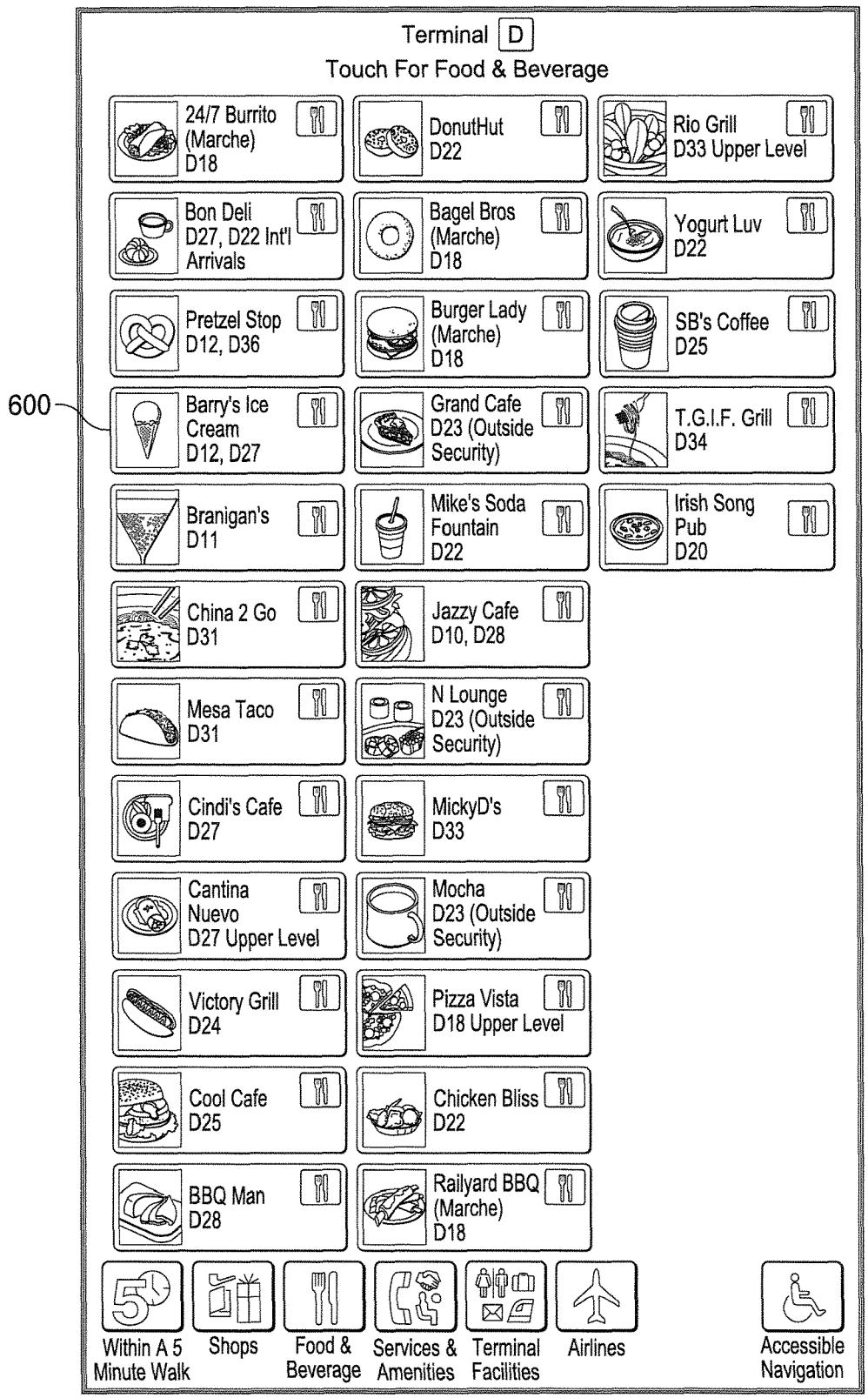
FIGS. 6A and 6B illustrate an example food and beverage information display in accordance with various embodiments of the present disclosure.
Figure 6B:
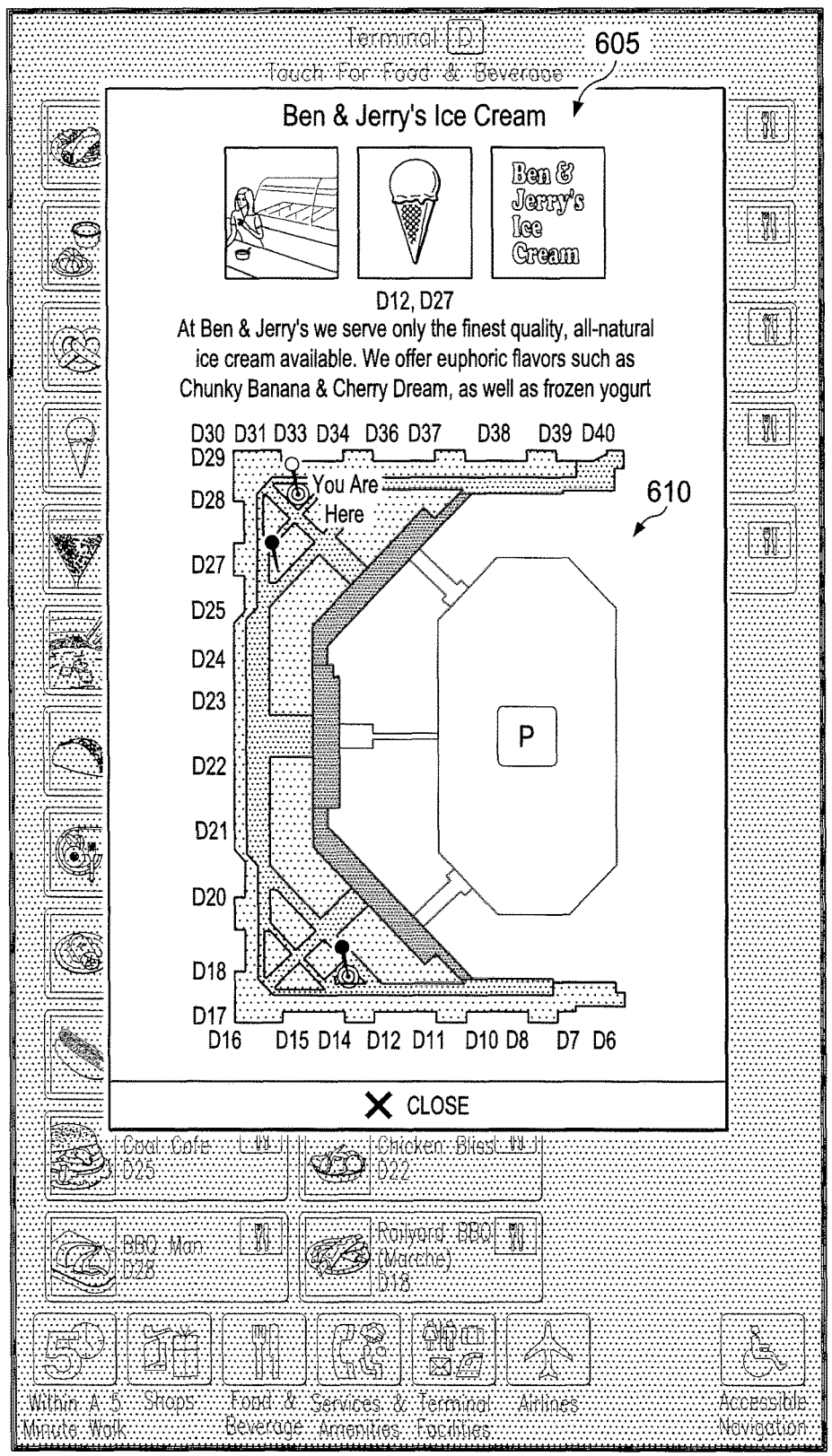

FIGS. 6A and 6B illustrate an example food and beverage information display in accordance with various embodiments of the present disclosure. In this illustrative example, selection of one of the icons 600 for a food and beverage provider from the display in FIG. 6A results in detailed information 605 about the food and beverage provider, and may include a map of locations 610, items served, pricing, advertisements, coupons, and the ability to purchase and have items delivered.

Figure 7A:
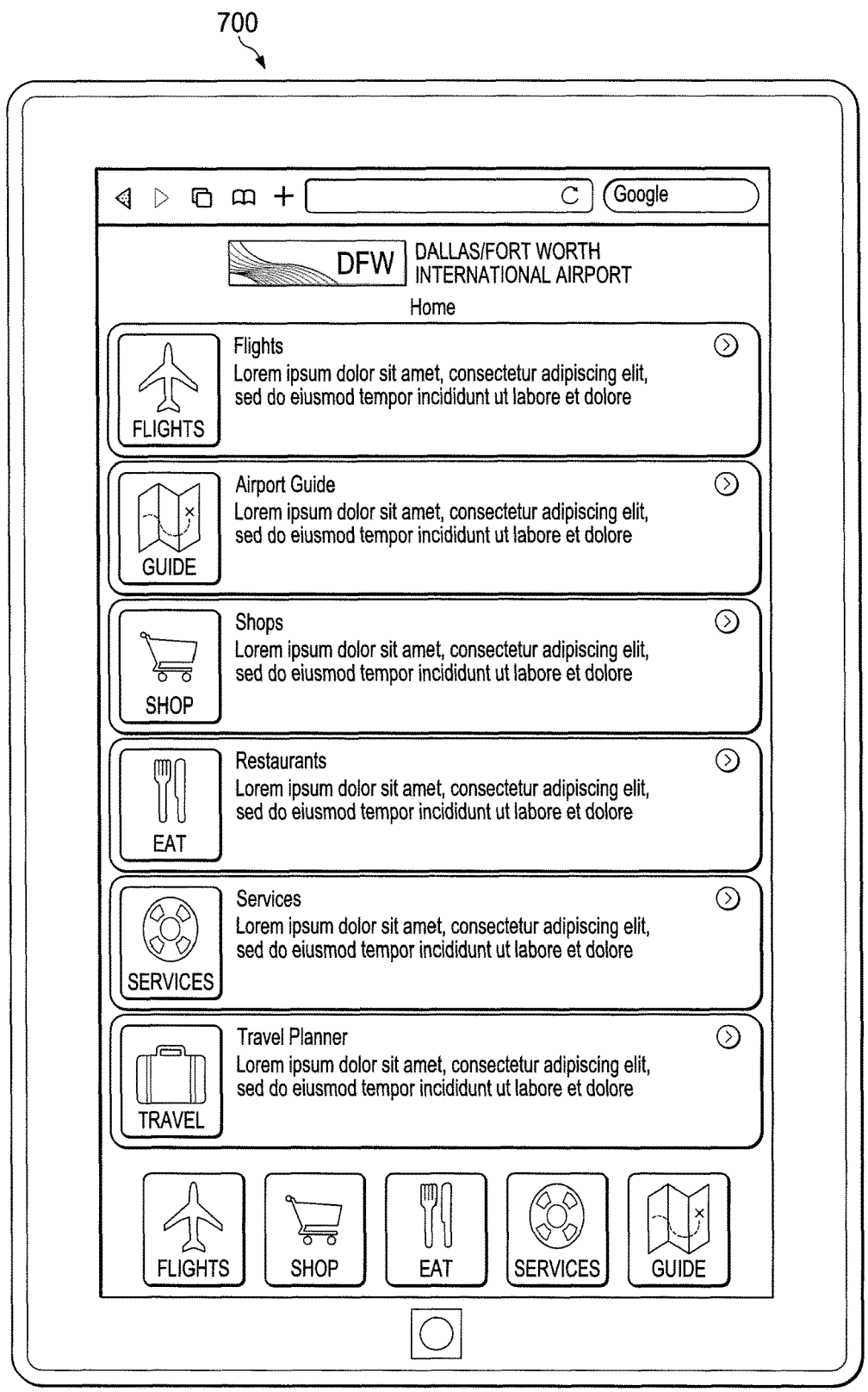
FIGS. 7A-C illustrate examples of information from a digital ambassador module formatted for display on a mobile personal electronic device in accordance with various embodiments of the present disclosure.
Figure 7B:
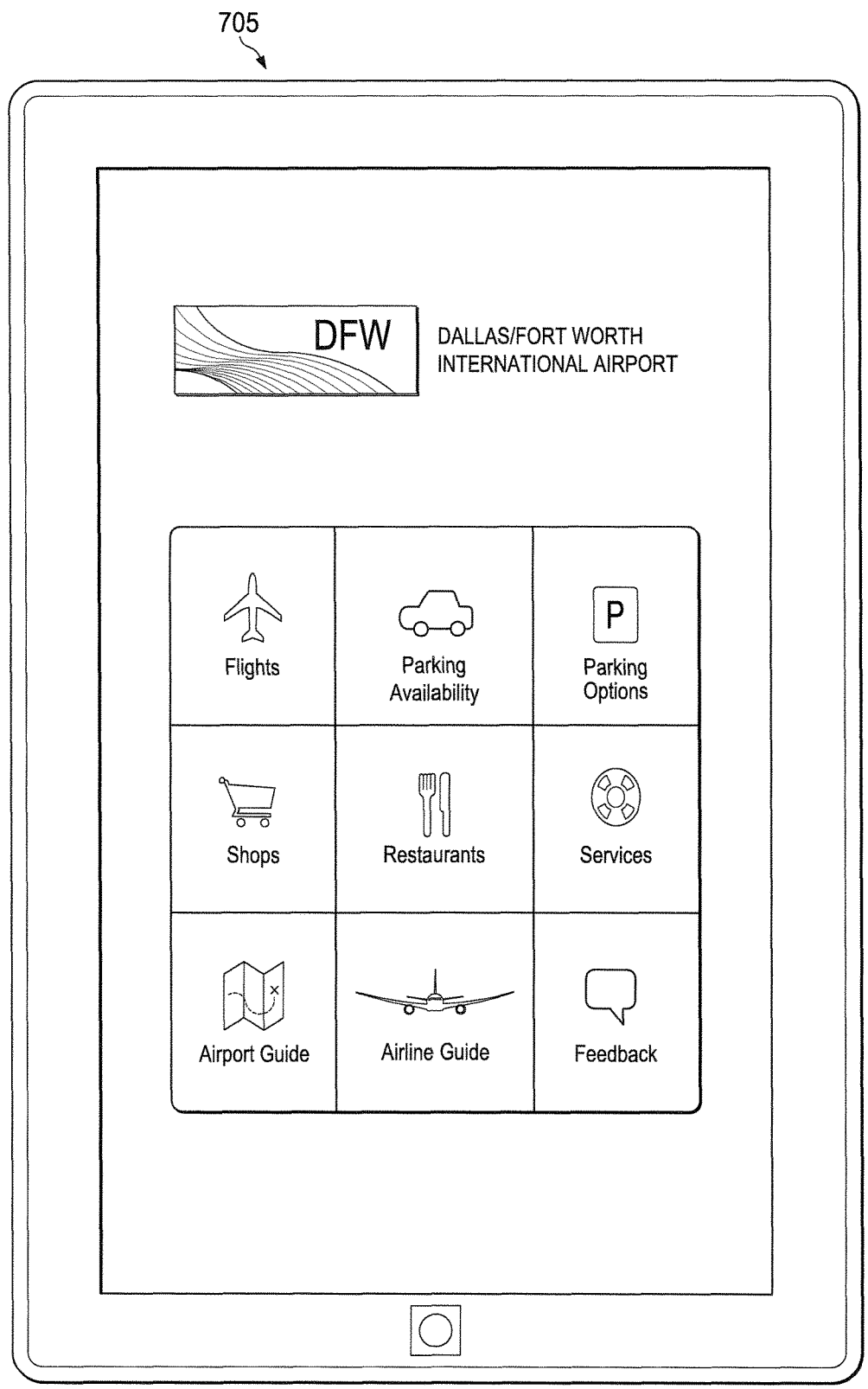
Figure 7C:
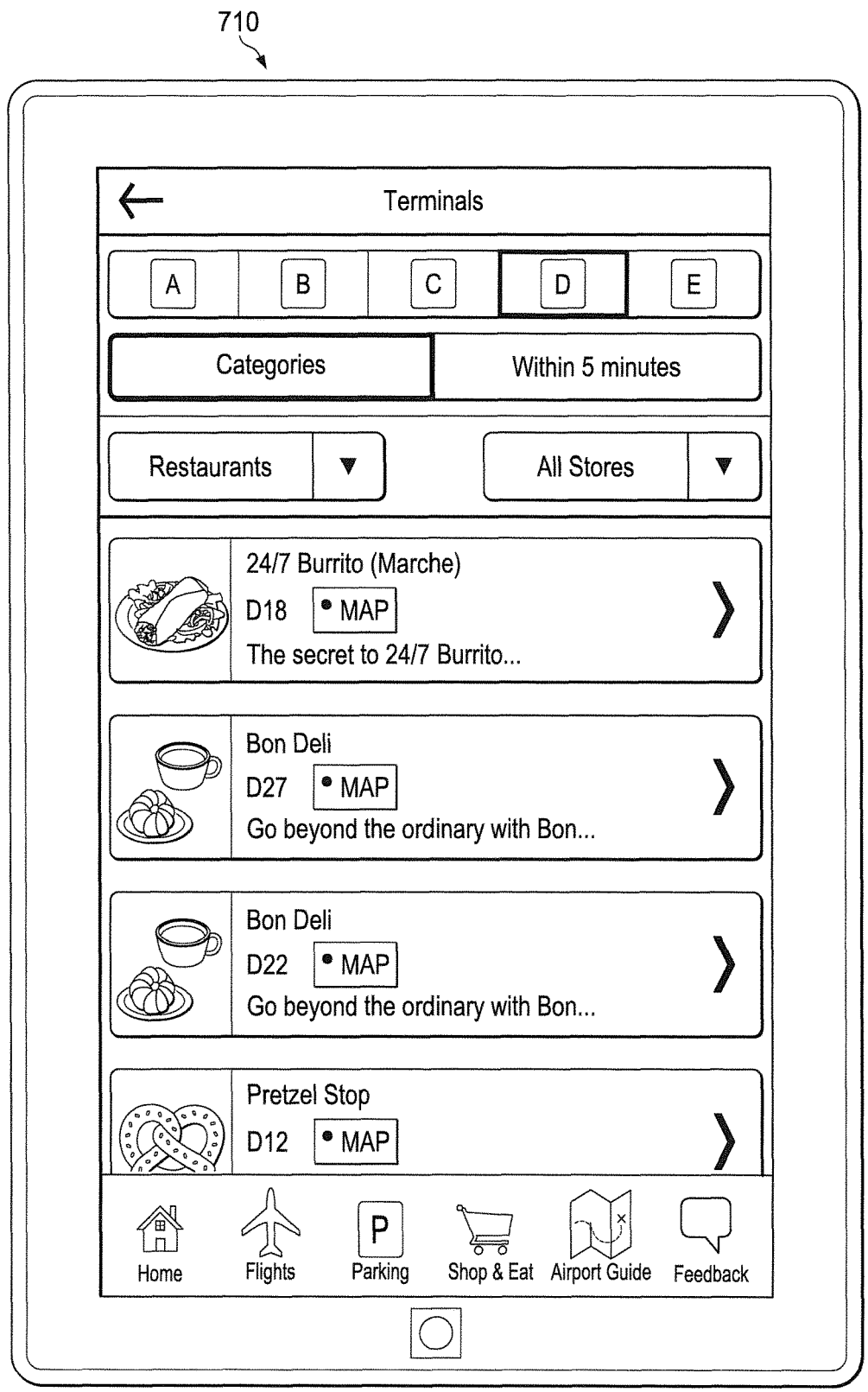

As discussed herein, any and all of the information displayable on the stationary display kiosk may be formatted for display and displayed on a mobile device, such as a mobile phone, tablet, laptop, etc. This information may be presented via a web browser or by a mobile application. For example, FIGS. 7A-C illustrate examples of information from digital ambassador module 240 formatted for display on mobile personal electronic devices in accordance with various embodiments of the present disclosure. FIG. 7A illustrates information for the digital ambassador module 240 displayed on mobile device 700 via a web application. FIG. 7B illustrates a home screen for the digital ambassador module 240 displayed on mobile device 705 via a native application for the mobile device 705, such as, an application or "app" downloadable from an application store. FIG. 7C illustrates an example food and beverage information display for the digital ambassador module 240 displayed on mobile device 705 via the native application for the mobile device 705. As illustrated in FIGS. 7A-C, the same or similar information displayable on a stationary display kiosk such as the display 400 in FIG. 4 including the functionality for the icons 405, 425, and 440-460 may be accessible to users via their personal mobile device.

Figure 8:
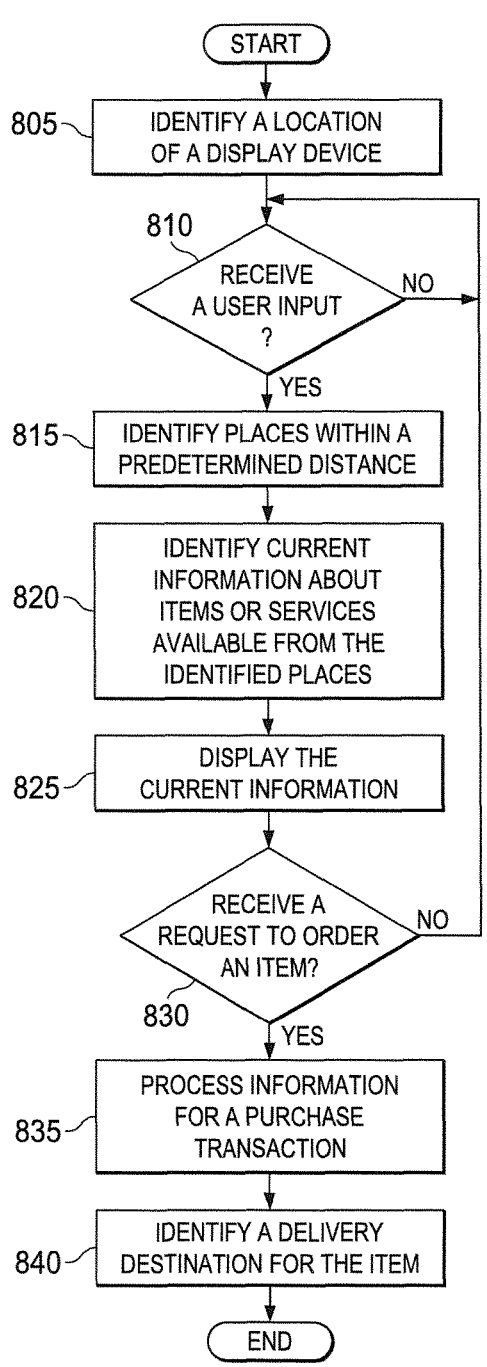
FIG. 8 illustrates an example process for identifying information to display in accordance with various embodiments of the present disclosure.

FIG. 8 illustrates an example process for identifying information to display in accordance with various embodiments of the present disclosure. The process can be performed, for example, by one or more of the server or client devices 104-114 in FIG. 1. The process can be implemented by executable instructions stored in a non-transitory computer-readable medium that cause one or more devices to perform such a process.

The process begins by identifying a location of a display device (step 805). For example, in step 805, the process may identify the location to provide location-based services and information. The display device may be a stationary display, such as a terminal kiosk; or a mobile display, such as a display for mobile device. The process may first, if the display device is for a user's mobile device, request permission to track and/or obtain the user's location.

The process then determines whether a user input is received (step 810). For example, in step 810, the process may recognize a user input to identify services and amenities available to the user. If a user input is received, the process identifies places within a predetermined distance (step 815). For example in step 815, the process may identify locations of available services and amenities located within a travel environment, such as an airport. In some embodiments, the input may be an input to request information about locations the user can visit within a predetermined period of time, (e.g. "within five minutes"). For example, the predetermined distance may be an estimated distance that a person can walk to within the predetermined period of time.

Thereafter, the process identifies current information about items or services available from the identified places (step 820). For example, in step 820, the process may query a database to determine current, up-to-date information about services offered and items available within the travel environment. The process then displays the current information (step 825).

Thereafter, the process determines whether a request to order an item is received (step 830). For example, in step 830, the user may provide inputs to order an item from a place associated with the current information displayed on the display device. If a request to order the item is received, the process then processes information for a purchase transaction (step 835). For example, in step 835, the process may receive from the user or from user profile information, such as payment information, needed to complete the purchase transaction. In various embodiments, the payment processing and/or order entry may be managed by a third-party service, such as a vendor and/or payment processing system. For example, a web application for a third-party may be launched from the display device to allow the user to complete ordering of the item and/or entry of payment information. In these embodiments, steps 830 and 835 may simply involve identifying that the user desires to place an order, launching a third-party web application, and providing an interface for the user to send information to the third-party service.

The process then identifies a delivery destination for the item (step 840). For example, in step 840, the process may receive a user input on the desired delivery destination or identify the delivery destination based on the user's current location, heading direction, a gate associated with the user's travel itinerary, or stored profile information. For example, the delivery destination may be the location of the display device where the item was ordered, a dynamic location of a mobile device of a purchaser of the item at a time of delivery based on current user tracking information, and/or a travel gate.

While steps 830 to 840 describe an example process for ordering an item using a display device in accordance with embodiments of the present disclosure, the display device of the present disclosure may be utilized to provide other services to a user. For example, in various embodiments, the display device may allow the user to track information about a flight or register for notifications to be sent to a user's mobile device.

Figure 9:
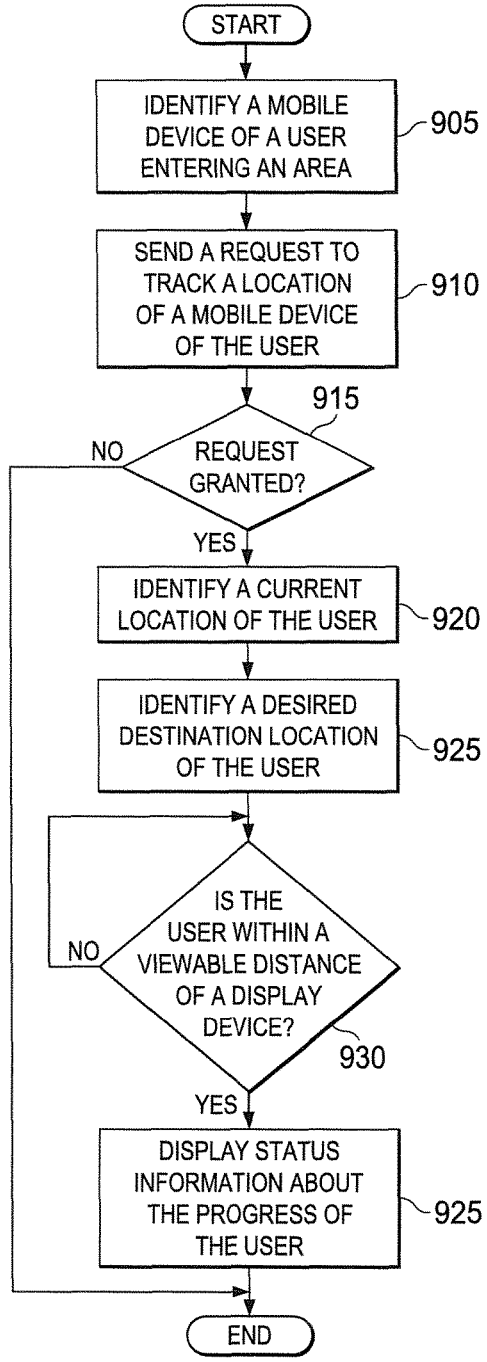
FIG. 9 illustrates an example process for displaying status information in accordance with various embodiments of the present disclosure.

FIG. 9 illustrates an example process for displaying status information in accordance with various embodiments of the present disclosure. The process can be performed, for example, by one or more server or client devices 104-114 in FIG. 1. The process can be implemented by executable instructions stored in a non-transitory computer-readable medium that cause one or more devices to perform such a process.

The process begins by identifying a mobile device of a user entering an area (step 905). For example, in step 905, the process may identify the mobile device entering or nearing an airport or an area near a stationary display kiosk. The process then sends a request to track the location of a mobile device of the user (step 910). Thereafter, the process determines whether the request to track the mobile device location is granted (step 915).

If the request to track is granted, the process identifies a current location of the user (step 920). For example, in step 920, the process may identify and track the location of the user's mobile device using a GPS signal or by cell service provider localization or multilateration.

The process then identifies a desired destination location of the user (step 925). For example, in step 925, the process may identify the desired destination location from a user profile, travel reservation information, a code on a ticket scanned by the user's mobile device, or a user input of the desired destination location.

Thereafter, the process determines whether the user is within a viewable distance of a display device (step 930). For example, in step 930, the process may determine based on the location and/or heading of the mobile device in proximity to a known location and facing direction of a display device.

If the user is within a viewable distance of the display device, the process displays status information about the progress of the user (step 935). For example in step 935, the process may provide information on the route or directions to the desired destination location and the user's current progress towards the desired destination location. This information may be displayed on the user's mobile device or a stationary display kiosk determined to be in proximity to the user's vantage point. The displayed status information may include directions to a desired destination location, an estimated amount of time for the user to arrive at the desired destination location, and an indication of whether the user is headed in a correct direction to reach the desired destination location. The process may continue to periodically track, monitor, and provide a display of status information to the user throughout the user's route to reach the desired destination location.

Figure 10:
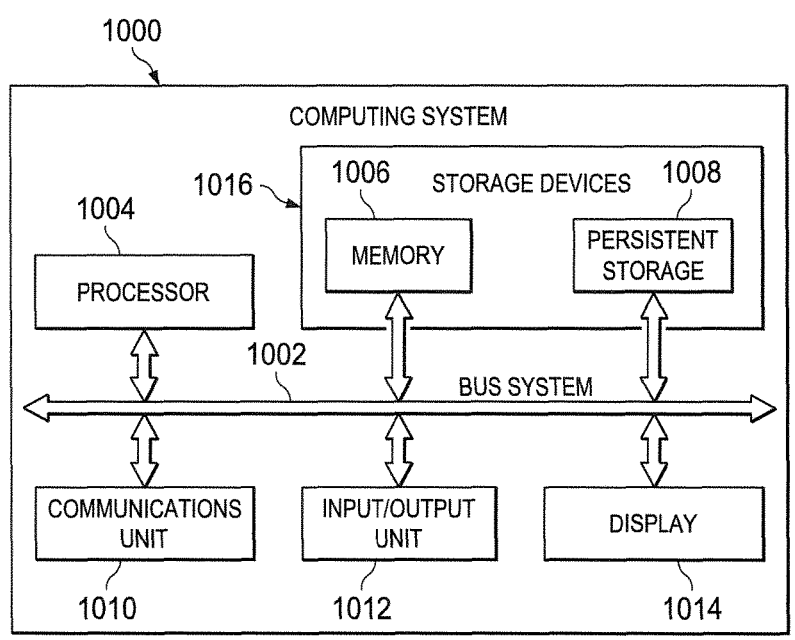
FIG. 10 illustrates an example computing system capable of implementing various embodiments of the present disclosure.

FIG. 10 illustrates an example computing system 1000 in accordance with this disclosure. The computing system 1000 could, for example, represent an implementation of the client devices 110-114 or server computers 104-106. For example, the computing system 1000 may be implemented in a mobile user device, a stationary display kiosk, or a server computer providing information for display on the mobile user device or the stationary display kiosk.

In this example, the computing system 1000 includes a bus system 1002, which provides communications between a processor 1004, a memory 1006, a persistent storage 1008, a communications unit 1010, an input/output (I/O) unit 1012, and a display 1014. The processor 1004 processes instructions for software that may be loaded into the memory 1006. The processor 1004 may include a number of processors, a multi-processor core, or some other type of processor, depending on the particular implementation. Further, the processor 1004 may be implemented using a number of heterogeneous processor systems in which a main processor is present with secondary processors on a single chip. As another example, the processor 1004 may be a symmetric multi-processor system containing multiple processors of the same type.

The memory 1006 and the persistent storage 1008 are examples of storage devices 1016. A storage device is any piece of hardware capable of storing information, such as data, program code, and/or other suitable information on a temporary or permanent basis. The memory 1006 in the embodiments above may be, for example, a random access memory or any other suitable volatile or non-volatile storage device. The persistent storage 1008 may contain one or more components or devices. For example, the persistent storage 1008 may be a hard drive, a flash memory, an optical disk, a rewritable magnetic tape, or any other type of persistent storage device. The media used by the persistent storage 1008 also may be removable, such as when a removable hard drive is used as the persistent storage 1008.

The communications unit 1010 provides for communications with other computer systems or devices. As an example, the communications unit 1010 could include a network interface card or a wireless transceiver. The communications unit 1010 may provide communications through physical or wireless communications links.

The input/output unit 1012 allows for input and output of data using other devices that may be connected to the computing system 1000. For example, the input/output unit 1012 may provide a connection for user input through a keyboard, a mouse, or another suitable input device. The input/output unit 1012 may also send output to a display, printer, or other suitable output device. The display 1014 provides a mechanism to visually present information to a user.

Program code for an operating system, applications, or other programs may be located in the storage devices 1016, which are in communication with the processor 1004 through the bus system 1002. In some embodiments, the program code is in a functional form on the persistent storage 1008. These instructions may be loaded into the memory 1006 for processing by the processor 1004. The processes of the different embodiments may be performed by the processor 1004 using computer implemented instructions, which may be located in the memory 1006. For example, processor 1004 may perform processes for one or more of the modules and/or devices described above.

In some embodiments, various functions described above are implemented or supported by a computer program product that is formed from computer readable program code and that is embodied in a computer-readable medium. Program code for the computer program product may be located in a functional form on a computer-readable storage device that could be selectively removable and may be loaded onto or transferred to the computing system 1000 for processing by the processor 1004. In some embodiments, the program code may also be downloaded over a network to the persistent storage 1008 from another device or computer system for use within the computing system 1000. For instance, program code stored in a computer-readable storage medium in a server computer system may be downloaded over a network from the server to the computing system 1000. The computer system providing the program code may be a server computer, a client computer, or some other device capable of storing and transmitting program code.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of", when used with a list of items, means that different combinations of one or more of the listed items may be used, and only one item in the list may be needed. For example, "at least one of item A, item B, and item C" may include, without limitation, item A or item A and item B.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for identifying information to display, the method comprising:

identifying a location of a display;

identifying, in response to a user input comprising an amount of time to the display, items or services available to a user of the display based on the location of the display and the amount of time, wherein the amount of time is an amount of time available before a time associated with a scheduled travel event of the user;

displaying, on the display, current information about the items or services available to the user, identifying a location of at least one place that provides the items or services;

identifying a travel departure location associated with the scheduled travel event;

determining, based on the location of the at least one place and the travel departure location, whether the user has enough time available before the time associated with the scheduled travel event to travel to the location of the at least one place to receive a desired item or service; and in response to receiving a selection of the desired item or service and in response to determining that the user does not have enough time to travel to the location of the at least one place to receive the desired item or service, requesting delivery of the desired item or service to a waiting area associated with the travel departure location.

2. The method of claim 1, wherein:

identifying the items or services available to the user comprises:

identifying places that a user can walk to within the amount of time based on the location of the display; and identifying the items or services available at the identified places.

3. The method of claim 1, wherein:

identifying the items or services available to the user comprises:

identifying a location of a waiting area associated with the scheduled travel event; and identifying the items or services that can be delivered to or provided at the location of the waiting area within the amount of time.

4. The method of claim 1, wherein:

identifying the items or services available to the user further comprises identifying an amount of time to consume the desired item or service at the location, and determining whether the user has enough time to travel to the location of the at least one place comprises determining whether the user has enough time available before the time associated with the scheduled travel event to travel to the location of the at least one place.

5. The method of claim 1, wherein the display is a display for a mobile device of the user.

6. The method of claim 1, wherein the display is a stationary display device for an information kiosk.

7. The method of claim 1, further comprising communicating with a third-party payment processing system to complete a purchase transaction of the desired item or service.

8. An apparatus comprising:

a display; and at least one processor configured to:

identify a location of a display;

identify, in response to a user input comprising an amount of time to the display, items or services available to a user of the display based on the location of the display and the amount of time, wherein the amount of time is an amount of time available before a time associated with a scheduled travel event of the user;

cause the display to display current information about the items or services available to the user;

identify a location of at least one place that provides the items or services;

identify a travel departure location associated with the scheduled travel event;

determine, based on the location of the at least one place and the travel departure location, whether the user has enough time available before the time associated with the scheduled travel event to travel to the location of the at least one place to receive a desired item or service; and in response to receiving a selection of the desired item or service and in response to determining that the user does not have enough time to travel to the location of the at least one place to receive the desired item or service, request delivery of the desired item or service to a waiting area associated with the travel departure location.

9. The apparatus of claim 8, wherein:

to identify the items or services available to the user, the at least one processor is configured to:

identify places that a user can walk to within the amount of time based on the location of the display; and identify the items or services available at the identified places.

10. The apparatus of claim 8, wherein:

to identify the items or services available to the user, the at least one processor is configured to:

identify a location of a waiting area associated with the scheduled travel event; and identify the items or services that can be delivered to or provided at the location of the waiting area within the amount of time.

11. The apparatus of claim 8, wherein:

to identify the items or services available to the user, the at least one processor is configured to identify an amount of time to consume the desired item or service at the location, and to determine whether the user has enough time to travel to the location of the at least one place, the at least one processor is configured to determine whether the user has enough time available before the time associated with the scheduled travel event to travel to the location of the at least one place.

12. The apparatus of claim 8, wherein the display is a display for a mobile device of the user.

13. The apparatus of claim 8, wherein the display is a stationary display device for an information kiosk and the at least one processor is co-located with the display or located remotely from the display.

14. The apparatus of claim 8, wherein the at least one processor is further configured to communicate with a third-party payment processing system to complete a purchase transaction of the desired item or service.

15. A non-transitory computer-readable medium embodying a computer program for identifying information to display, the computer program comprising computer-readable program code for:

identifying a location of a display;

identifying, in response to a user input comprising an amount of time to the display, items or services available to a user of the display based on the location of the display and the amount of time, wherein the amount of time is an amount of time available before a time associated with a scheduled travel event of the user;

generating, for display on the display, current information about the items or services available to the user, identifying a location of at least one place that provides the items or services;

identifying a travel departure location associated with the scheduled travel event;

determining, based on the location of the at least one place and the travel departure location, whether the user has enough time available before the time associated with the scheduled travel event to travel to the location of the at least one place to receive a desired item or service; and in response to receiving a selection of the desired item or service and in response to determining that the user does not have enough time to travel to the location of the at least one place to receive the desired item or service, requesting delivery of the desired item or service to a waiting area associated with the travel departure location.

16. The computer-readable medium of claim 15, wherein: the program code for identifying the items or services available to the user comprises program code for:
identifying places that a user can walk to within the amount of time based on the location of the display; and
identifying the items or services available at the identified places.

17. The computer-readable medium of claim 15, wherein: the program code for identifying the items or services available to the user comprises program code for:
identifying a location of a waiting area associated with the scheduled travel event; and
identifying the items or services that can be delivered to or provided at the location of the waiting area within the amount of time.

18. The computer-readable medium of claim 15, wherein: the program code for identifying the items or services available to the user further comprises program code for identifying an amount of time to consume the desired item or service at the location, and
the program code for determining whether the user has enough time to travel to the location of the at least one place comprises program code for determining whether the user has enough time available before the time associated with the scheduled travel event to travel to the location of the at least one place and consume the desired item or service at the location.

19. The computer-readable medium of claim 15, wherein the display is a display for a mobile device of the user or a stationary display device for an information kiosk.

20. The computer-readable medium of claim 15, wherein the computer program further comprises program code for communicating with a third-party payment processing system to complete a purchase transaction of the desired item or service.

* * * * *